United States Patent
Henrickson et al.

(10) Patent No.: US 12,299,608 B2
(45) Date of Patent: May 13, 2025

(54) GENERATION OF NAVIGATIONAL ROUTE NETWORKS

(71) Applicant: Uber Technologies, Inc., San Francisco, CA (US)

(72) Inventors: Kristian Henrickson, San Francisco, CA (US); Zijian Li, San Francisco, CA (US); Kazumori Haruna, San Francisco, CA (US); Aaron Chazhoor, San Francisco, CA (US); Philippe Sekine, San Francisco, CA (US); Ashwin Prabhu, San Francisco, CA (US); Hoang Ly, San Francisco, CA (US); David O'Neil, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 142 days.

(21) Appl. No.: 17/733,788

(22) Filed: Apr. 29, 2022

(65) Prior Publication Data
US 2023/0351274 A1    Nov. 2, 2023

(51) Int. Cl.
G06Q 10/047    (2023.01)
G01C 21/34     (2006.01)
G06Q 30/0204   (2023.01)

(52) U.S. Cl.
CPC ....... *G06Q 10/047* (2013.01); *G01C 21/3438* (2013.01); *G06Q 30/0205* (2013.01)

(58) Field of Classification Search
CPC .. G06Q 10/047; G06Q 30/0205; G06Q 50/30; G01C 21/3438
See application file for complete search history.

(56) References Cited

U.S. PATENT DOCUMENTS

| 4,858,120 A | 8/1989 | Samuelson |
| 10,359,783 B2 | 7/2019 | Williams |

(Continued)

FOREIGN PATENT DOCUMENTS

| CN | 202443493 | 9/2002 |
| CN | 104021668 | 9/2014 |

(Continued)

OTHER PUBLICATIONS

Liang, Rerouting Buses using Data Science—Part 1, Open Government Products, Jan. 15, 2019, https://blog.data.gov.sg/ rerouting-buses-using-data-science-part-i-4d6c9d4f1f.

(Continued)

*Primary Examiner* — Keith D Bloomquist
(74) *Attorney, Agent, or Firm* — Mahamedi IP Law LLP

(57) ABSTRACT

A system can arrange a plurality of transport services in a geographic region by matching received transport requests from requesters with standard vehicles to facilitate transport of the requesters to destinations indicated in the transport requests. The transport requests can comprise both requests for standard vehicles and high-capacity vehicle (HCV) requests from HCV requesters. Based on a set of transport services for HCV requesters, from the plurality of transport services, the system can determine over a specified duration of time, a set of demand data for HCV transport services in the geographic region. The system can then execute a route design model using the set of demand data to generate an HCV route network for the geographic region.

18 Claims, 7 Drawing Sheets

(56) References Cited

U.S. PATENT DOCUMENTS

| | | |
|---|---|---|
| 10,425,490 B2 | 9/2019 | Yamashita |
| 10,697,784 B1 | 6/2020 | Li |
| 11,122,255 B2 | 9/2021 | Rahematpura |
| 11,482,111 B2 | 10/2022 | Kuhn |
| 2003/0195699 A1 | 10/2003 | Jones |
| 2006/0178812 A1 | 8/2006 | Affleck |
| 2009/0192851 A1 | 7/2009 | Bishop |
| 2010/0036606 A1 | 2/2010 | Jones |
| 2010/0185486 A1* | 7/2010 | Barker .................. G06Q 10/06 705/7.31 |
| 2010/0325719 A1 | 12/2010 | Etchegoyen |
| 2011/0099040 A1 | 4/2011 | Felt |
| 2012/0130627 A1 | 5/2012 | Islam |
| 2012/0232943 A1 | 9/2012 | Myr |
| 2013/0158846 A1 | 6/2013 | Zhang |
| 2013/0226627 A1 | 8/2013 | Kubovcik |
| 2014/0051465 A1 | 2/2014 | Ruys |
| 2015/0142497 A1* | 5/2015 | Osumi ................. G06Q 10/083 705/7.23 |
| 2015/0206437 A1 | 7/2015 | Fowler |
| 2015/0271290 A1 | 9/2015 | Tao |
| 2015/0324708 A1 | 11/2015 | Skipp |
| 2015/0348221 A1 | 12/2015 | Pedersen |
| 2015/0369621 A1 | 12/2015 | Abhyanker |
| 2016/0055605 A1 | 2/2016 | Kim |
| 2016/0129787 A1 | 5/2016 | Netzer |
| 2016/0209220 A1 | 7/2016 | Laetz |
| 2016/0210691 A9 | 7/2016 | LaFrance |
| 2016/0232719 A1 | 8/2016 | Brinig |
| 2016/0247247 A1 | 8/2016 | Scicluna |
| 2016/0307287 A1 | 10/2016 | Jat |
| 2016/0307289 A1 | 10/2016 | Choksi |
| 2016/0373473 A1 | 12/2016 | Truong |
| 2017/0052034 A1 | 2/2017 | Magazinik |
| 2017/0169366 A1 | 6/2017 | Klein |
| 2017/0193458 A1 | 7/2017 | Marco |
| 2017/0314948 A1 | 11/2017 | Racah |
| 2018/0025407 A1 | 1/2018 | Zhang |
| 2018/0032964 A1 | 2/2018 | Gkiotsalitis |
| 2018/0060988 A1 | 3/2018 | Klenk |
| 2018/0091604 A1 | 3/2018 | Yamashita |
| 2018/0101877 A1 | 4/2018 | Song |
| 2018/0143027 A1 | 5/2018 | Schlesinger |
| 2018/0188049 A1* | 7/2018 | Shi ....................... G06Q 10/047 |
| 2018/0281803 A1 | 10/2018 | Mukai |
| 2018/0302743 A1 | 10/2018 | Bai |
| 2018/0339712 A1 | 11/2018 | Kislovskiy |
| 2019/0146508 A1* | 5/2019 | Dean .................... G05D 1/0285 701/26 |
| 2019/0146509 A1 | 5/2019 | Dean |
| 2019/0154454 A1 | 5/2019 | Verma |
| 2019/0156254 A1* | 5/2019 | Hansen .............. G06Q 10/0631 |
| 2019/0164432 A1 | 5/2019 | Quitoriano |
| 2019/0212149 A1 | 7/2019 | Ho |
| 2020/0042019 A1 | 2/2020 | Marczuk |
| 2020/0168100 A1 | 5/2020 | Quitoriano |
| 2020/0192366 A1 | 6/2020 | Levinson |
| 2020/0292346 A1 | 9/2020 | Turner |
| 2020/0356911 A1* | 11/2020 | Sahin ..................... G06Q 50/30 |
| 2020/0393256 A1* | 12/2020 | Sahin ...................... H04W 4/42 |
| 2020/0402392 A1 | 12/2020 | Robinson |
| 2021/0020047 A1 | 1/2021 | Kuhn |
| 2021/0108931 A1 | 4/2021 | Liu |
| 2021/0295707 A1 | 9/2021 | Quitoriano |
| 2022/0170753 A1 | 6/2022 | Verma |
| 2022/0355834 A1 | 10/2022 | Kuhn |
| 2023/0114253 A1 | 4/2023 | Quitoriano |

FOREIGN PATENT DOCUMENTS

| | | |
|---|---|---|
| CN | 104537831 | 4/2015 |
| CN | 103136933 | 7/2015 |
| CN | 10585148 | 12/2015 |
| CN | 105679076 | 6/2016 |
| CN | 106408099 | 2/2017 |
| CN | 107451690 | 12/2017 |
| CN | 109034566 | 12/2018 |
| CN | 109493588 | 3/2019 |
| EP | 3355028 | 8/2018 |
| KR | 10-2019-007627 | 7/2019 |
| WO | WO 2012/167319 | 12/2012 |
| WO | WO 2016/0127109 | 8/2016 |
| WO | WO 2017/0132447 | 8/2017 |

OTHER PUBLICATIONS

Pan Juan; Proactive Vehicle re-routing strategies for congestion avoidance, 2017, NJIT.edu, https://web.njit.edu/ borcea/ papers/ dcross 12.pdf (2017).

Luo, Shuyu: Optimization: Loss Function under the Hood (Part I), Sep. 24, 2018, Towards Data Science (2018).

Luo, Shuyu: Loss Function (Part II): Logistic Regression, Oct. 13, 2018, Medium.com (2018).

Luo, Shuyu, Loss Function (Part III) Support Vector Machine, Oct. 15, 2018, Medium.com (2018).

* cited by examiner

GENERATION OF NAVIGATIONAL ROUTE NETWORKS

BACKGROUND

High capacity transit through metropolitan areas typically involves trains and/or buses traveling fixed routes with fixed pick-up and drop-off stations and on fixed schedules.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
FIG. 1A illustrates a road network prior to the demand discovery and route configuration processes described herein.

Determining the nature of a high-capacity vehicle (HCV) route network has typically involved an approach in which a public transport network is created, with various routes and stops configured and built for the road network, and in which fixed schedules for each route are configured based on anticipated and observed ridership. HCV route planning and scheduling for public transit, such as a bus system, seeks to anticipate ridership demand using generalities such as localized population density, general income levels for neighborhoods, commercial versus residential zones, temporal commuter flows, and traffic patterns. More granular factors involve a general avoidance of left turns (for right-side drive territories) or right turns (for left-side drive territories) and weighing trade-offs between predicted traffic volumes, the potential need for designated transit lanes, visibility for transit operators, height and width clearances, vehicle size and capacity, snow removal, trees and other vegetation, on-street parking areas, the need for signage and/or crosswalks, whether transit riders will be required to cross multi-laned roads, etc. Furthermore, certain existing urban road networks throughout the world pre-date or were not designed for HCV services and public transit. In these road networks, traffic and lack of transit options have prevented efficient movement of commuters and others throughout their cities and towns.

Furthermore, it is contemplated that HCVs can serve specific demographics that may differ by city and/or region and collecting information regarding the potential demand for HCV services for these distinct demographics can pose a significant challenge when these services either don't exist or have not been planned. Examples described herein provide for an HCV demand discovery phase specifically for HCV services, rather than general population movement and/or commuting for a given region.

To improve the shortcomings described above, a system is provided herein that utilizes an existing rideshare network service in which typical or standard vehicles (e.g., sedans, SUVs, minivans, etc.) are matched with riders requesting HCV transport. In some examples, the system can utilize data from transport services requested by and/or completed for riders in a geographic region, including riders that requested HCV transport services but were matched with standard vehicles, to perform a demand discovery process in order to determine the nature of HCV transport demand in the given geographic region. As described herein, an HCV vehicle is a vehicle that is not a standard vehicle, but one that is designed for and/or capable of transporting more people and/or goods than a standard vehicle (e.g., more than eight). As further described herein, an HCV vehicle can provide relative ease for entering and exiting the vehicle (e.g., such as a large van, shuttle, bus, etc.), and may be suitable for mass transit purposes.

A primary factor in a requesting user's decision to utilize HCV transport involves the lower costs of riding HCV vehicles as compared to carpool vehicles or standard rideshare vehicles. Accordingly, in the demand discovery phase for the given region, the system can match users of the rideshare service that request HCV transport with standard rideshare vehicles (e.g., carpool vehicles, sedans, coupes, hatchbacks, sport utility vehicles (SUVs), minivans, luxury vehicles, etc.) at the lower fare or fare rate of hypothetical HCV transport. It is contemplated that subsequent to the demand discovery phase, HCV ride requesters that had been matched with standard rideshare vehicles at HCV fares or fare rates will have a high conversion rate to HCV transport when HCV routes and schedules are configured based on the demand discovery phase.

In the demand discovery phase, the system can identify the current locations of HCV requesters (and/or start locations) when HCV requests are received and their respective destinations. As more and more HCV requests are serviced by the system, the system can implement a route design model that processes the spatial and temporal characteristics of the serviced HCV requests (e.g., time of each request, start location, destination, actual times of arrival of matched vehicles to start locations, actual times to destination for each ride, walking distances, and the like). Using map data of the road network of the given region stored in a map database(s), the route design model can converge on optimal routes for HCVs within the road network, optimal stops for each optimal route, and optimal schedules for each HCV route in the road network. For example, the route design model can perform such optimizations for the purpose of maximizing distance utilization of HCV riders given the seat capacity of HCVs servicing the routes, such that relatively full HCVs are operating along a route at any given time.

In a route configuration phase, the system can further generate a set of simulations for HCVs operating along hypothetical routes using the discovered demand characteristic in the demand discovery phase. The HCVs can vary in seat capacity, and the system can perform such simulations using seat capacities of existing or planned HCV fleets for the given region. As an example, an HCV fleet may comprise a certain number of busses with fourteen, twenty, and thirty-four seats. The system can execute ridership simulations using the number and capacity of these busses to determine a most optimal HCV route network, as well as a most optimal HCV schedule for each route in the network—which can include selections of particular busses with particular seat capacities to service those routes at specified times.

When the route design model and/or HCV service simulations using the discovered demand characteristics have converged on optimal routes and schedules for each route, the system can implement a matching engine to match HCV requesters with actual HCVs operating along the optimal routes. The matching engine can receive HCV ride requests from requesting user, which can include a current location, desired pickup location, and/or a destination. Based on this information, the matching engine can track the locations of HCVs operating along the optimal routes, and match the HCV requester to an optimal HCV that will transport the HCV requester to a location or fixed stop along the route that corresponds to the requester's destination.

Among other benefits, the examples described herein achieve a technical effect of utilizing a current rideshare service to match HCV requesters with standard rideshare vehicles at typical HCV price points for a geographic region in order to discover HCV demand for the region and enable a computing system to execute route and scheduling optimizations to create an optimized HCV route network for the geographic region.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) systems, network equipment (e.g., routers) and tablet devices. Memory, processing, and network resources may all be used in connection with the establishment, use, or performance of any example described herein (including with the performance of any method or with the implementation of any system).

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be executed. In particular, the numerous machines shown in some examples include processors and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

HCV Route Network Creation Overview

FIG. 1A illustrates a road network 100 prior to the demand discovery and route configuration processes described herein. The road network 100 can include any number of roads, highways, alleyways, traffic lights, and intersections. In the example shown in FIG. 1A, a generalized residential area 104 and business area 102 are indicated as potential HCV route start areas and end areas, with any number of potential stops configured therebetween. In FIG. 1A, the road network 100 does not yet have an HCV route network in which HCVs can transport riders throughout the road network on fixed schedules with fixed stops. A computing system described herein can facilitate on-demand transport for requesting users throughout the road network 100 and can provide the users with an option to ride on HCV transport at typical HCV fares or fare rates. During a demand discovery phase, the computing system can match HCV riders with standard rideshare vehicles (e.g., sedans) to determine start locations, destinations, and timings of potential HCV rides throughout the road network 100.

Figure 1B:
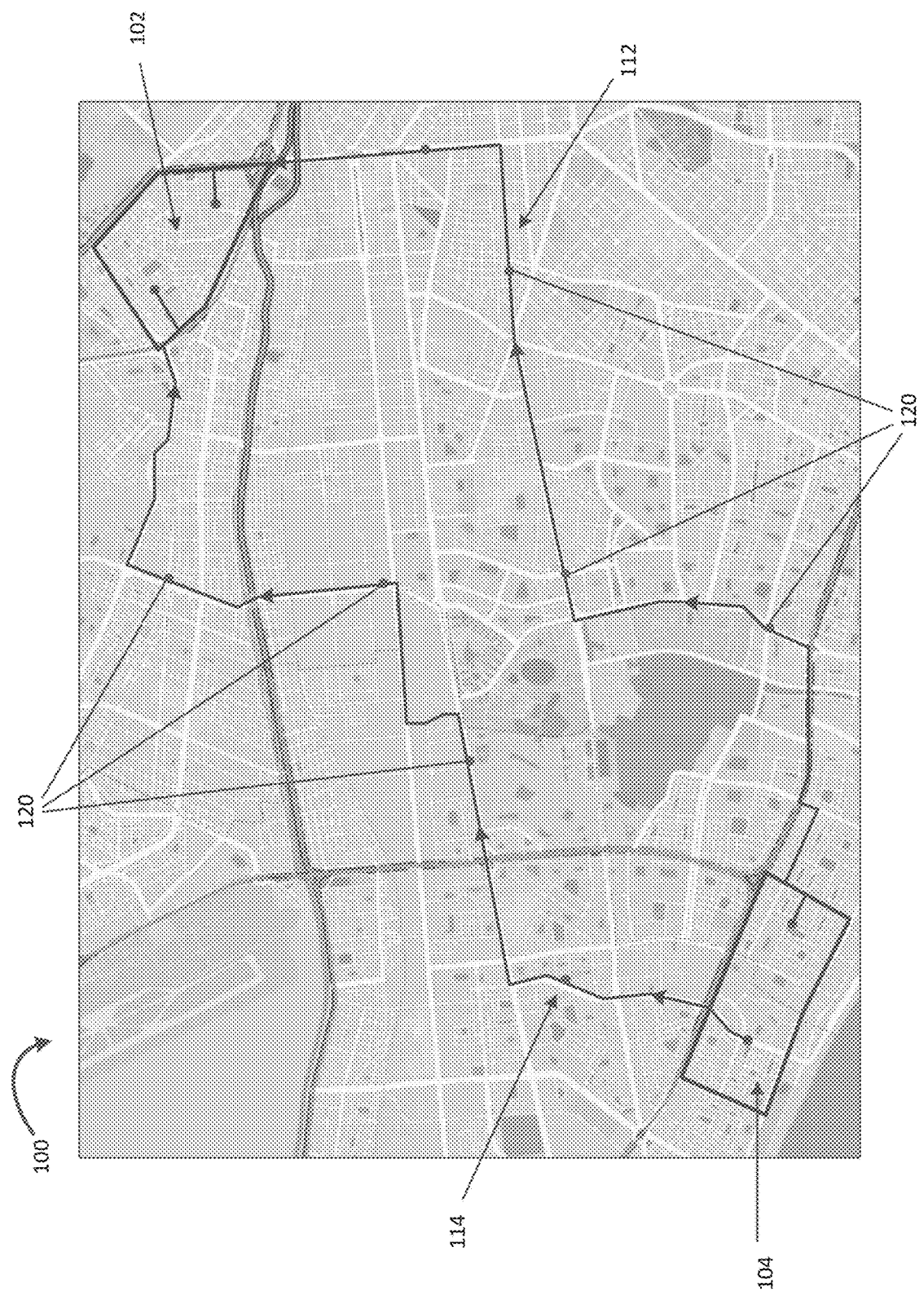
FIG. 1B illustrates the road network subsequent to the demand discovery and route configuration processes, described herein.

After a period of time (e.g., a number of weeks or months), the computing system can use the demand information discovered in the demand discovery phase to perform HCV route and scheduling optimizations and determine a set of HCV routes for the given road network 100. Referring to FIG. 1B, a pair of HCV routes 112, 114 have been created by the computing system subsequent to the demand discovery phase, with optimally positioned stops 120 along each HCV route 112, 114. In the example shown in FIG. 1B, each HCV route 112, 114 have been optimally configured based on servicing HCV ride requests with standard rideshare vehicles during the demand discovery phase. The computing system can further utilize the demand information to determine an optimal schedule for each HCV route 112, 114 and even an optimal seat capacity for HCVs traveling along the HCV routes 112, 114 at any given time. It is contemplated that such an approach to HCV route and schedule design can maximize utilization of HCV services for the road network 100, making transport for the road network 100 more efficient, contributing to a reduction in traffic congestion and overall vehicle emissions.

The examples shown in FIGS. 1A and 1B are merely for illustrative purposes, and subsequent to the demand discovery phase for a given road network 100, any number of optimized HCV routes 112, 114 with their own optimal schedules and HCVs operating along those routes can result. Furthermore, the HCV routes 112, 114 may be created in any direction with any number of stops based on the discovered HCV demand using existing rideshare services.

System Description

Figure 2:
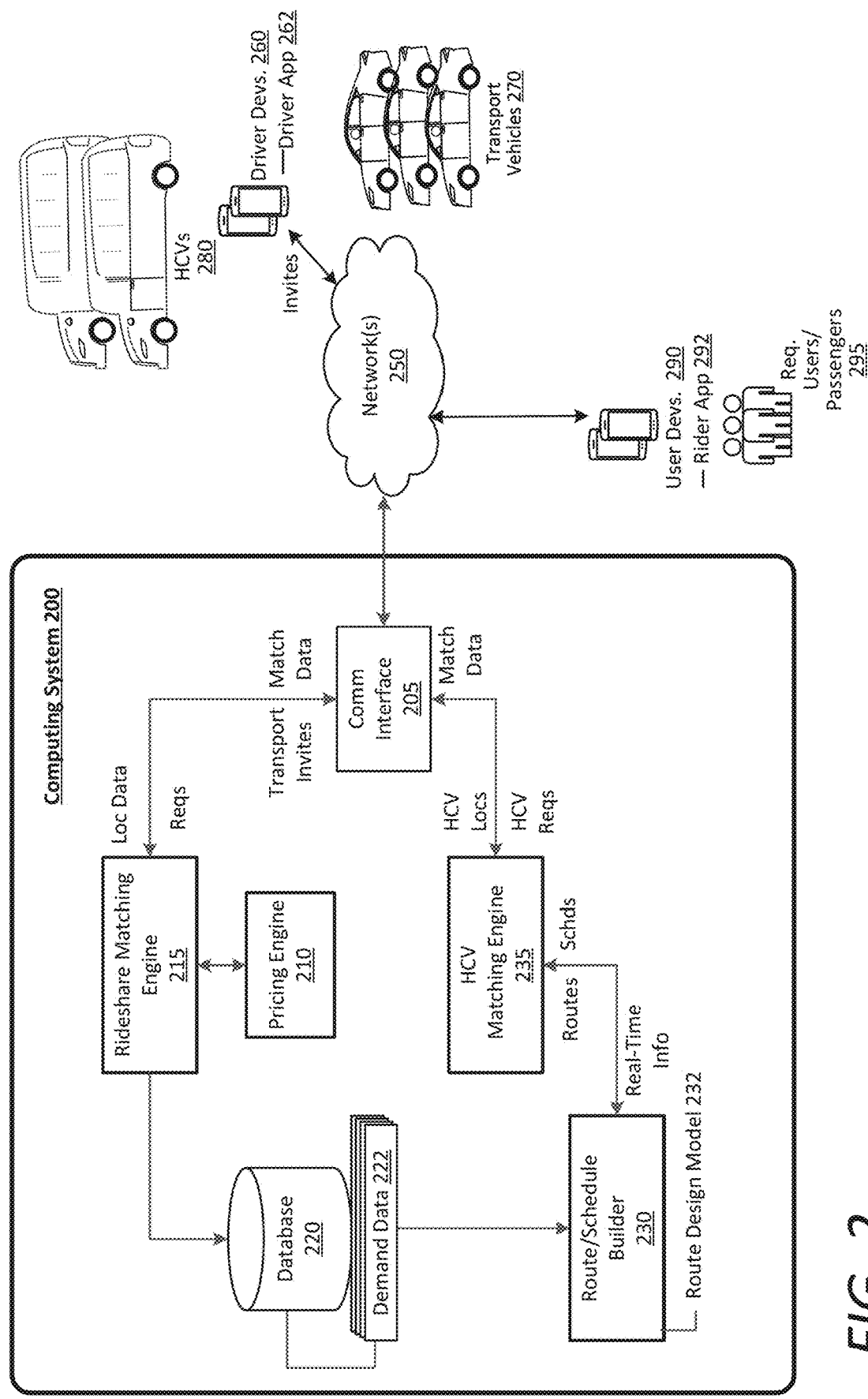
FIG. 2 illustrates computing system implementing the demand discovery and route configuration processes for a road network, in accordance with examples described herein.

FIG. 2 illustrates computing system 200 implementing the demand discovery and route configuration processes for a road network, in accordance with examples described herein. Prior to the optimal deployment of HCVs 280 for a given region, the computing system 200 can perform standard rideshare matching using standard transport vehicles 270. In implementation, a requesting user 295 can launch a rider application 292 on the user's computing device 290, select a destination, and select from any number of rideshare options (e.g., carpool, dedicated car, luxury vehicle, professional driver, van, truck, or high-capacity vehicle 280, such as a bus). The computing system 200 can include a communication interface 205 that enables the computing system 200 to communicate with user computing devices 290 and driver computing devices 260 over one or more networks 250 via respective rider apps 292 and driver apps 262 executing on their computing devices 290, 260.

In various implementations, the computing system 200 can include a rideshare matching engine 215 that receives location data from the driver computing devices 260 to match the drivers of the transport vehicles 270 with requesting users 295 seeking transport. Specifically, a requesting user 295 can indicate a destination in a transport request transmitted to the rideshare matching engine 215. The rideshare matching engine 215 can filter the transport vehicles 270 based on the particular rideshare option requested by the user 295, and select an optimal transport vehicle 270 to service the transport request (e.g., based on distance and/or estimated time of arrival (ETA) of the transport vehicle 270 to the start location of the requesting user 295 (e.g., the current location of the user 295 or an indicated pickup location). The rideshare matching engine 215 can then transmit a transport invitation to the computing device 260 of the selected driver, which enables the driver to accept or decline the invitation. When the driver accepts the invitation, the rideshare matching engine 215 can monitor the ride (e.g., using location data from the computing devices 260, 290 of the driver and user 295 respectively) to ensure that the transport request has been serviced accordingly.

While FIG. 2 illustrates a distinct rideshare matching engine 215 and HCV matching engine 235, in various examples these components can comprise a single matching engine that handles all received transport requests.

According to examples described herein, the rider app 292 can present a rideshare option for HCV rides (e.g., bus rides), which can be associated with an HCV cost that is typically lower than other rideshare options. In an HCV demand discovery phase, the rideshare matching engine 215 can match these HCV ride requests with standard transport vehicles 270, which can result in significantly lower emissions than using actual HCVs 280 for demand discovery. The computing system 200 can further include a pricing engine 210 that sets the fares or fare rates for the various rideshare options. It is contemplated that the use of standard transport vehicles 270 to service HCV requests at (lower) HCV costs will result in a high conversion rate when actual HCVs 280 are eventually deployed.

It is contemplated that in the HCV demand discovery phase, the user experience for HCV requesters and standard rideshare vehicle requesters can be substantially the same. For example, the requesting users 295 can utilize the rider app 292 on their computing devices 290 to select from multiple rideshare options, which can include an HCV rideshare option.

In various examples, the computing system 200 can include a database 220 to store demand data 222 compiled from the serviced transport requests facilitated by the rideshare matching engine 215. The demand data 222 can include details for each received and serviced HCV request during the demand discovery phase. Such details can include spatial details, such as the locations of the HCV requesters at the time of the HCV request, requested pickup locations, requested destinations, walking distances to pickup locations, walking distances from drop-off locations to actual destinations, and routes taken to service the HCV requests. The details can further include temporal details, such as the time and date of the HCV request, respective times for pickup and drop-off of the HCV requester, ETA information for picking up and dropping off the HCV requester, actual times for picking up and dropping off the HCV requesters, and the like. In further examples, the demand data 222 can further include spatial and temporal information related to other request types, such as carpool ride requests and non-pool ride requests that may indicate potential demand for HCV rides.

In further examples, the demand data 222 can include ratings and survey information indicating rider preferences (e.g., preferences for lower costs, high or low ratings for serviced rides, and the like. In various implementations, the computing system 200 can include a route and schedule builder 230 that executes a route design model 232 using the demand data 222 to generate an optimal HCV route network and schedules for each route for the geographic region. For example, the demand data 222 can indicate relative routes in which the seats of a hypothetical HCV 280 would be mostly full as the hypothetical HCV 280 traverses the relative routes at different time windows. Execution of the route design model 232 can factor in seat capacity of potential HCVs 280 traveling along the routes at given times, and can simulate actual HCVs 280 servicing the HCV requests in the demand data 222.

Furthermore, the route design model 232 can determine an optimal HCV route network, optimal stops along the optimized routes, and schedules for each optimized route in order to maximize distance utilization of the HCV requesters 295. In other words, the route design model 232 converges on HCV routes and schedules in which HCVs 280 traversing along the scheduled routes have as many seats filled as possible at any given point along the schedule routes. As an example, the demand data 222 can indicate that HCVs traveling along a specified sequence of roads at specified times or time intervals will result in an average HCV occupancy of 90% over the course of the route. The route design model 232 can simulate nearby routes and fine-tune different schedules and/or stops to maximize the distance utilization for the hypothetical HCV, and can converge on a most optimal HCV route, schedule, and set of stops (e.g., having an average HCV occupancy greater than 90% over the course of the route).

In some examples, the route and schedule builder 230 can further account for anticipated traffic congestion, fuel consumption, road conditions, intersections (e.g., those having high accident rates and/or require lengthy wait times), anticipated wear and tear on HCVs (e.g., oil change schedules, brake replacements, tire replacements, etc.), clearances (e.g., bridge clearance, turn clearance for larger vehicles, etc.), dedicated lanes (e.g., carpool lanes and/or bus lanes), and the like. Each of these factors can contribute to the route and schedule builder 230 determining the optimal HCV routes and schedules for the geographic region. Once the optimal HCV routes and schedules are determined by the route and schedule builder 230, an HCV matching engine 235 of the computing system 200 can match HCV requests received from the requesting users 295 to HCVs 280 operating along the optimal HCV routes.

In certain examples, the HCV routes may be fixed and may have fixed stops along the routes. In such examples, the HCV matching engine 235 can match a given HCV request to a particular stop along an optimal HCV route, and can indicate an anticipated wait time for pickup, an estimated time to destination, and can further provide walking directions from a current location of the requesting user 295 to the pickup stop and walking directions from the drop-off stop to the desired destination of the user 295 (e.g., on a map interface of the rider app 292). In variations, the HCV routes and/or stops may be updated or modified by the route and schedule builder 230 based on real-time information received by the computing system 200, such as road construction information, real-time HCV demand clusters, event data, detours, and the like.

In implementation, the HCV matching engine 235 can monitor location data from the HCVs 280 (or driver devices 260 of drivers operating the HCVs 280) operating along the optimal routes in accordance with the route schedules. In certain examples, the HCV matching engine 235 can further track the current occupancy or available seat capacity of each HCV 280 operating along the optimal HCV routes. Accordingly, when an HCV request is matched to a particular stop along an HCV route, the requesting user 295 can be provided with additional information regarding whether a seat is available on an upcoming HCV 280, or how many seats are available on an upcoming HCV 280.

In various implementations, the HCV matching engine 235 receives an HCV request from the user device 290 of a requesting user 295, which can indicate a desired pickup location, a current location of the user 295, and/or a desired destination. Based on this information, the HCV matching engine 235 can identify an optimal HCV route and stops that require minimal walking distance and/or time for the requesting user 295. Furthermore, the HCV matching engine 235 can identify an upcoming HCV 280 operating along the optimal HCV route that has the available seat(s) required by the requesting user 295 for transport. The HCV matching engine 235 can then provide the HCV driver with match information indicating that the requesting user 295 requires pickup at a selected stop along the optimal HCV route, and can further indicate the drop-off stop at which the requesting user 295 will disembark from the HCV 280. The HCV matching engine 235 can further provide the requesting user 295 with match information indicating the pickup and drop-off stops, details of the matched HCV (e.g., vehicle description, license plate number, driver name, vehicle color, etc.), walking directions, and/or any information concerning the available seats on the HCV 280.

As such, the HCV matching engine 235 can perform HCV matching for the entirety of the optimal HCV route network for the geographic region. The HCV matching engine 235 can transmit transport invitations or dispatch requests to HCV drivers to start a particular route at a particular time in accordance with the HCV route schedule. The HCV route schedule may indicate an optimal seat capacity for an HCV starting a route at a particular time, which can be based on the demand data 222 obtained during the demand discovery phase. Accordingly, the HCV matching engine 235 can transmit transport invitations or dispatch requests to drivers of HCVs 280 that are operating an HCV 280 having the indicated optimal seat capacity in the route schedule.

In some scenarios, there may not be adequate seat capacity in upcoming HCVs 280 along a given route, as determined by real-time HCV requests received by the HCV matching engine 235. For example, an unanticipated surge in HCV demand along a particular route may result in lengthy wait times at HCV stops for the requesting users 295. In such scenarios, the computing system 200 can fall back to standard rideshare matching using the rideshare matching engine 215 such that all received HCV requests are serviced within reasonable timeframes. Thus, the route and schedule builder 230 is tasked with (i) creating the optimal HCV routes and schedules to both maximize distance utility of the HCV rides, and (ii) ensuring that seat are available for received HCV requests, since the fallback option is inherently inefficient as compared to using the HCVs 280.

As additional HCV demand data 222 is gathered and stored in the database 220, the route and schedule builder 230 can continue to fine-tune or optimize the HCV routes, schedules, and stops for the geographic region.

Methodology

Figure 3:
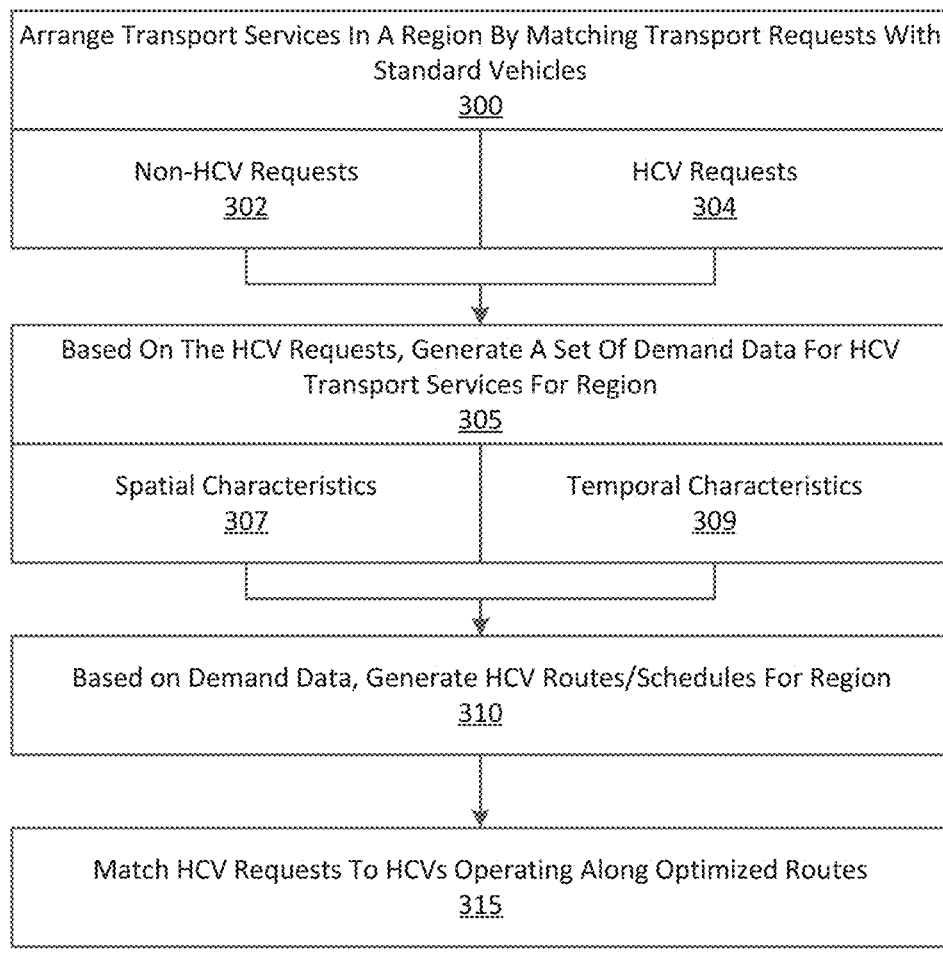
FIGS. 3 and 4 are flow charts describing example methods of implementing demand discovery and route configuration for a road network, in accordance with examples described herein.
Figure 4:
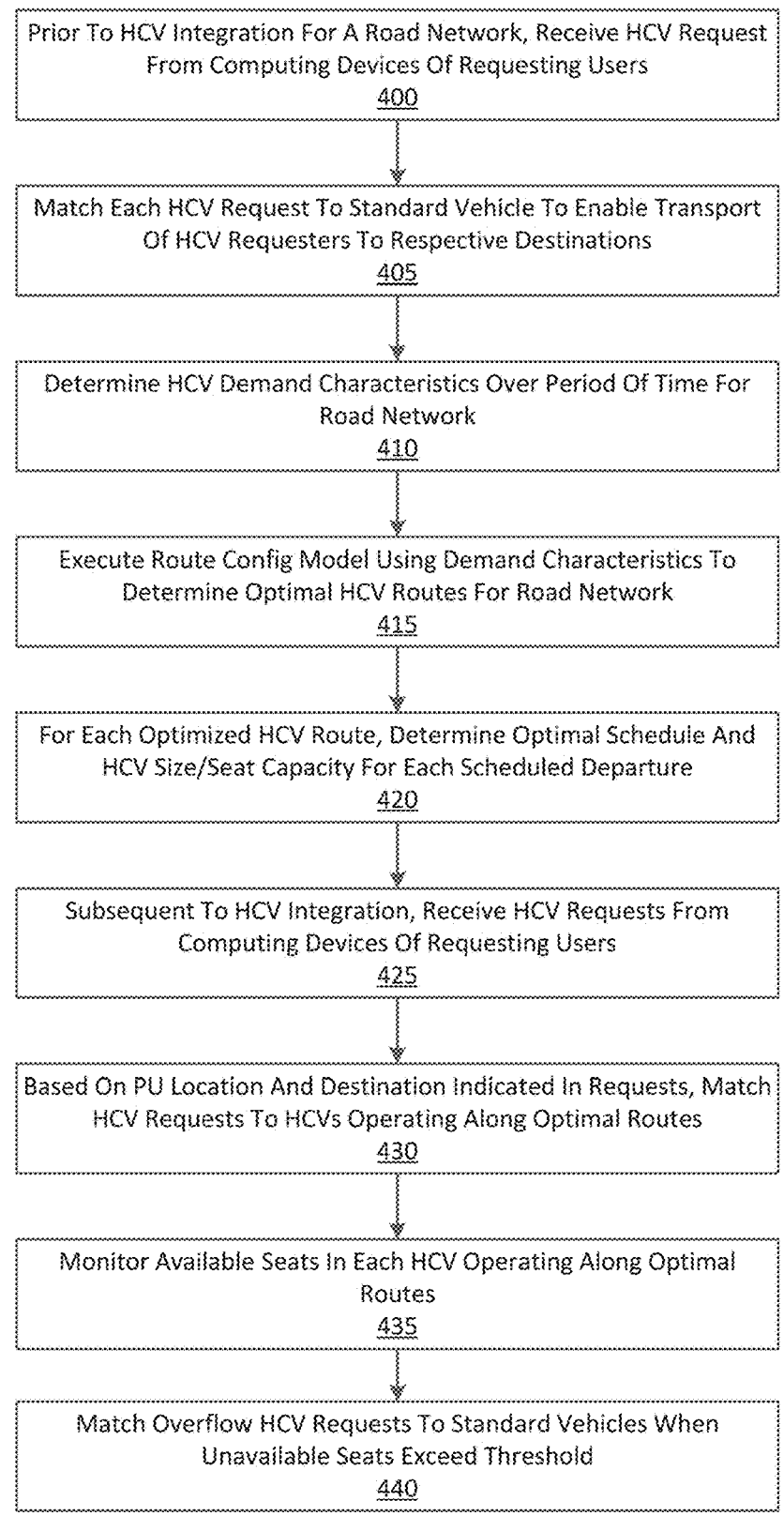

FIGS. 3 and 4 are flow charts describing example methods of implementing demand discovery and route configuration for a road network, in accordance with examples described herein. In the below discussion of FIGS. 3 and 4, reference may be made to reference characters representing like features and components as shown and described with respect to FIG. 2. Furthermore, the processes described in connection with FIGS. 3 and 4 may be performed by an example computing system 200 as described with respect to FIG. 2. Still further, the steps described in connection with FIGS. 3 and 4 need not be performed in any particular order, and each step may be performed prior to, in conjunction with, or subsequent to any other step.

Referring to FIG. 3, the computing system 200 can arrange transport services in a region by matching transport requests with standard vehicles, such as sedans (300). As described herein, the transport requests can comprise non-HCV requests (302) and HCV requests (304). As further described herein, the computing system 200 can perform such matching operations in an HCV demand discovery phase prior to the deployment of HCVs 280 throughout the region. Based on servicing the HCV requests with standard transport vehicles 270, the computing system 200 can generate a set of demand data 222 for HCV transport services for the region (305). In various examples, the computing system 200 can price HCV transport requests at fares or fares rates that correspond to HCV rides, such that conversion of HCV requesters to subsequently deployed HCV transport services is relatively high.

The demand data 222 can correspond to the spatial characteristics of each serviced HCV request (307). These spatial characteristics can include respective pickup locations and drop-off locations or destinations of the HCV requesters. In further examples, the spatial characteristics can include additional information, such as the home locations, work locations or areas, walking distances to pickup locations, walking distances from drop-off locations to actual destinations, and/or routes taken to service the HCV requests. The demand data 222 can further include temporal characteristics of the HCV requests, such as the timing of the requests, pickup times, drop-off times, and the like (309). Based on the demand data 222, the computing system 200 can generate a set of optimized HCV routes, schedules, and stops for the region (310). Thereafter, the computing system 200 can match HCV requests with HCVs 280 operating along the optimized HCV routes (315).

FIG. 4 is a more granular example method of performing demand discovery and HCV route configuration for a given region, according to examples described herein. Referring to FIG. 4, the computing system 200 can receive HCV transport request from computing devices 290 of requesting users 295 prior to HCV integration for a road network (400). The computing system 200 can match each HCV request to a standard vehicle (e.g., a sedan) to enable or provide on-demand transport for the HCV requesters to their respective destinations (405). The computing system 200 can further determine HCV demand characteristics over a period of time (e.g., the HCV demand discovery phase) for the road network (415).

In various examples, the computing system 200 can execute an HCV route design or configuration model 232 using the demand characteristics to determine optimal HCV routes, stops, and schedules for the road network (420). In certain implementations, the optimized routes, schedules, and stops are fixed for the road network. In variations, the route design or configuration model 232 can provide general HCV corridors in which HCVs 280 are to be optimally deployed to service HCV requests in an on-demand manner. In various examples, the computing system 200 can receive HCV requests from the computing devices 290 of requesting users 295 subsequent to HCV integration (e.g., after the HCV demand discovery phase) (425).

Based on the pickup location and destination indicated in each HCV request, the computing system 200 can match the HCV requests to HCVs 280 operating along the optimized HCV routes (430). In variations, the computing system 200 can match the HCV requests to specified HCV stops along the optimized routes and can further indicate a drop-off stop that is nearby the requested destination of the HCV request. In some aspects, the computing system 200 can further track or otherwise monitor available seats in each HCV 280 operating along the optimized HCV routes (435). If the seats for a particular HCV 280 are full, the computing system 200 can determine whether treating overflow HCV requests with standard rideshare matching is sensible (e.g., if wait times for upcoming HCVs 280 that have available seats are prohibitively high). If so, the computing system 200 can match the overflow HCV requests with standard transport vehicles 270 when unavailable seats and/or wait times exceed predetermine thresholds (440).

For example, if wait times along a particular HCV route exceeds fifteen minutes, the computing system 200 can implement a fallback protocol to service HCV requests along the delayed HCV route with standard transport vehicles 270. Additionally or alternatively, the computing system 200 can respond to increases in HCV demand along the optimized HCV routes by routing additional HCVs 280 along the high-demand routes. It is contemplated that the implementation of the demand discovery and HCV route building techniques described herein can result in the practical effect of increased HCV ridership in congested road networks, which can significantly reduce traffic and vehicle emissions, as well as providing a more efficient solution for transporting riders throughout the road network.

Example Computing Device

Figure 5:
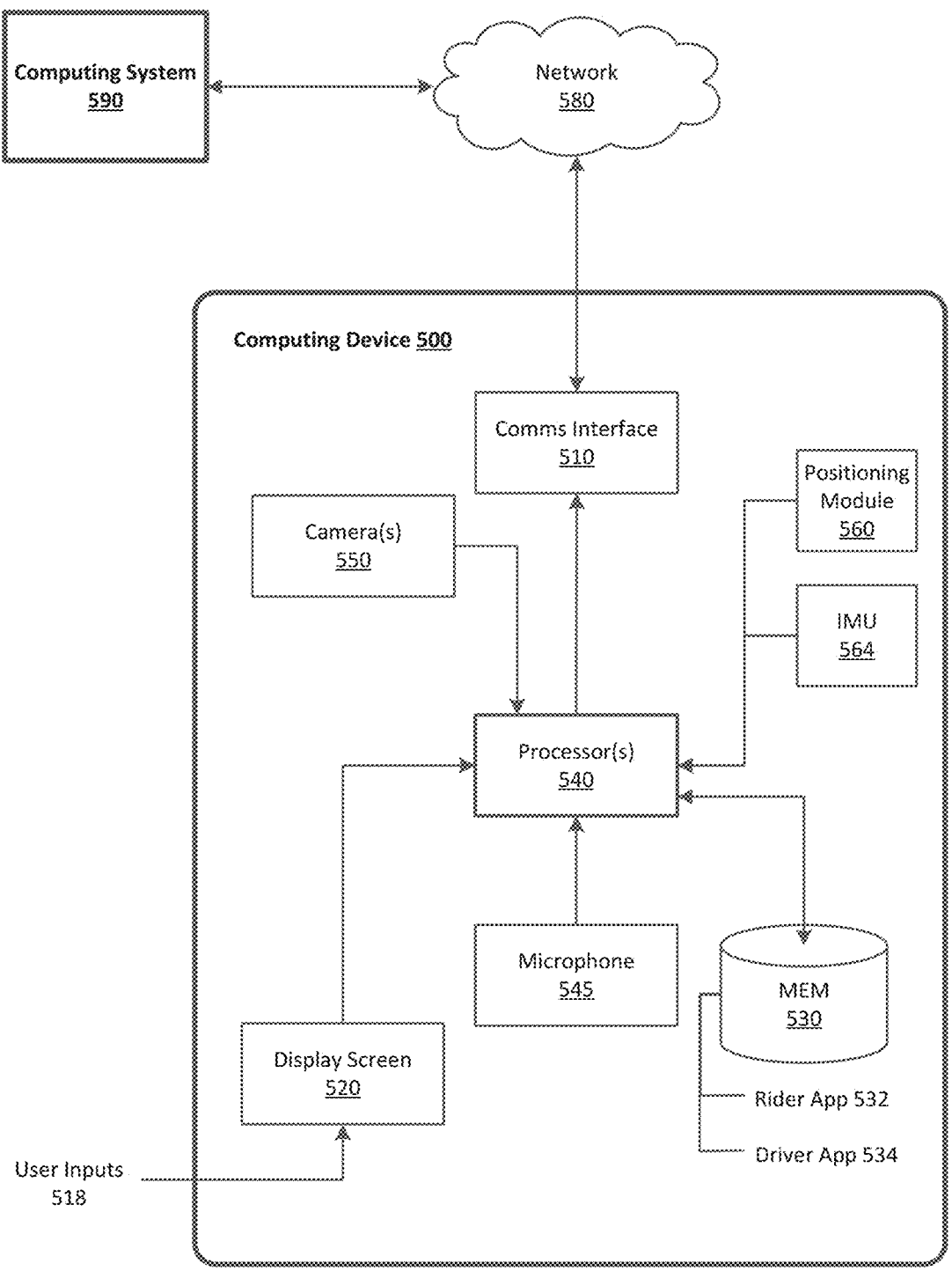
FIG. 5 is an example computing device utilized by requesting users and drivers of a transport service, as described herein.

FIG. 5 is an example computing device utilized by requesting users and drivers of on-demand transport services, as described herein. In many implementations, the computing device 500 can comprise a mobile computing device, such as a smartphone, tablet computer, laptop computer, VR or AR headset device, and the like, and can be controlled by either a human driver of a transport vehicle or HCV, or a requesting user 295, as described with respect to FIG. 2. The computing device 500 can include typical telephony features such as a microphone 545, one or more cameras 550 (e.g., a forward-facing camera and a rearward-facing camera), and a communication interface 510 to communicate with external entities using any number of wireless communication protocols. The computing device 500 can further include a positioning module 560 and an inertial measurement unit 564 that includes one or more accelerometers, gyroscopes, or magnetometers. In certain aspects, the computing device 500 can store a designated application (e.g., a rider app 532) in a local memory 530. In the context of FIG. 2, the rider app 532 can comprise the rider app 292 executable on the user device 290 of FIG. 2. In variations, the memory 530 can store additional applications executable by one or more processors 540 of the computing device 500, enabling access and interaction with one or more host servers or computing systems 590 over one or more networks 580.

In response to a user input 518, the rider app 532 can be executed by a processor 540, which can cause an app interface to be generated on a display screen 520 of the computing device 500. The app interface can enable the user to, for example, configure standard transport requests, HCV transport requests, or display turn-by-turn map or walking directions (e.g., based on route data transmitted by the computing system 590). In various implementations, the app interface can further enable the user to enter or select a destination location (e.g., by entering an address, performing a search, or selecting on an interactive map). The user can generate the transport request via user inputs 518 provided on the app interface. For example, the user can input a destination and select a transport service option to configure the transport request (e.g., an HCV transport option), and select a request feature that causes the communication interface 510 to transmit the transport request to the network computing system 590 over the one or more networks 580.

As provided herein, the rider application 532 can further enable a communication link with a network computing system 590 over the network(s) 580, such as the computing system 200 as shown and described with respect to FIG. 2. The processor 540 can generate user interface features (e.g., map, request status, etc.) using content data received from the network computing system 590 over the network(s) 580.

The processor 540 can transmit the transport requests via a communications interface 510 to the computing system 590 over the network 580. In response, the computing device 500 can receive a confirmation from the computing system 590 indicating a selected driver, standard transport vehicle, or HCV, that will service the request. In various examples, the computing device 500 can further include a positioning module 560, which can provide location data indicating the current location of the requesting user to the computing system 590 to, for example, determine the rendezvous location.

For drivers, the computing device 500 can execute a designated driver application 534 that enables the driver to input an on-duty or available status. In some examples, the driver app 534 can further enable the driver to select one or multiple types of transport service options to provide to requesting users, such as a standard on-demand rideshare option, a carpool option, or an HCV option if the driver is operating an HCV. For the latter option, the computing system 590 can coordinate with the HCV driver to route the driver to an optimized HCV route, and provide HCV ride matches based on HCV transport requests in a forward operational direction of the optimized route, as described herein.

Hardware Diagram

Figure 6:
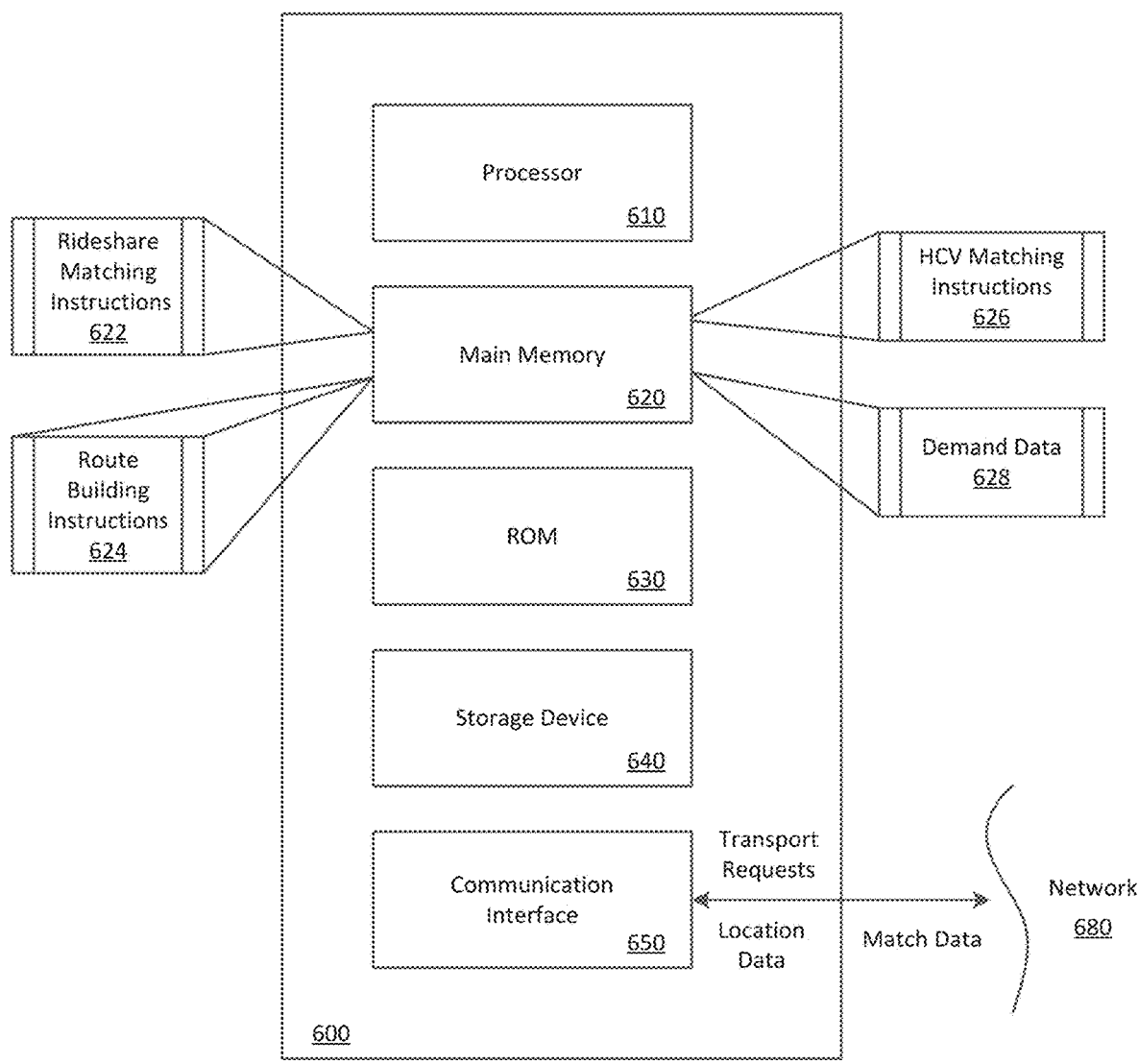
FIG. 6 is a block diagram illustrating an example computer system upon which examples described herein may be implemented.

FIG. 6 is a block diagram that illustrates a computer system 600 upon which examples described herein may be implemented. A computer system 600 can be implemented on, for example, a server or combination of servers. For example, the computing system 600 may be implemented as part of an on-demand transport service, such as described with respect to FIGS. 1-5. In the context of FIG. 2, the computing system 200 may be implemented using a computer system 600 such as described by FIG. 6. The computing system 200 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computing system 600 may also include the ROM 630 or other static storage device for storing static information and instructions for the processor 610. A storage device 640, such as a magnetic disk or optical disk, is provided for storing information and instructions.

The communication interface 650 enables the computing system 600 to communicate over one or more networks 680 (e.g., a cellular network and/or Wi-Fi network) through use of the network link (wireless or wired). Using the network link, the computing system 600 can communicate with one or more computing devices, one or more servers, one or more databases, and/or one or more vehicles. In accordance with examples described herein, the computing system 600 receives transport requests from mobile computing devices of requesting users, and location data from the computing devices of drivers operating through the given region. The executable instructions stored in the memory 630 can include rideshare matching instructions 622, which the processor 610 executes to receive the transport requests and match requesting users with drivers of transport vehicles, as described herein.

The executable instructions stored in the memory 620 can also include route building instructions 624, which the processor 610 can execute to process demand data 628 obtained during an HCV demand discovery phase, and create an optimal HCV route network, including optimal schedules and stops for a given region. The stored instructions can further include HCV matching instructions 626, which the processor(s) 610 execute to match HCV requests from requesting users with HCVs, HCV stops, and/or optimized HCV routes in the given region. Execution of the rideshare matching instructions 622 and HCV matching instructions 626 cause the computer system 600 to perform the matching operations described herein, and provide match data to the drivers and requesting users in order to facilitate the on-demand transport services described throughout the present disclosure.

Examples described herein relate to the use of the computing system 600 for implementing the techniques described herein. According to one example, those techniques are performed by the computing system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventors from claiming rights to such combinations.

What is claimed is:

1. A computing system implementing a transport service, comprising:
one or more processors;
a memory storing instructions that, when executed by the one or more processors, cause the computing system to:
receive requests for standard vehicles from computing devices of requesters in a geographic region;
receive requests for high-capacity vehicles (HCVs) from computing devices of HCV requesters in the geographic region;
for both the requests for standard vehicles and the requests for HCVs, match the received requests with standard vehicles to facilitate transport of the requesters and HCV requesters to destinations indicated in the requests;
based on transport arranged for the HCV requesters in the geographic region over a specified duration of time, generate a set of demand data for HCV transport services in the geographic region; and
execute a route design model using the set of demand data to generate an HCV route network for the geographic region, the HCV route network comprising a set of HCV routes and an HCV schedule for each HCV route in the set of HCV routes.

2. The computing system of claim 1, wherein the set of demand data comprise spatial and temporal aspects of the transport requests serviced for the HCV requesters over the specified duration of time.

3. The computing system of claim 2, wherein the spatial and temporal aspects correspond to a plurality of: a time for each of the HCV transport requests, start locations of the HCV requesters, and destinations of the HCV requesters.

4. The computing system of claim 1, wherein the standard vehicles comprise one or more of sedans, coupes, hatchbacks, station wagons, sport utility vehicles (SUVs), minivans, or luxury vehicles, and wherein the HCVs comprise at least one of vans, trucks, or buses having a seat capacity that exceeds seat capacities of the standard vehicles.

5. The computing system of claim 1, wherein the route design model further determines respective seat capacities for HCVs that are to operate on each respective HCV route of the set of HCV routes in accordance with the HCV schedule for the respective HCV route.

6. The computing system of claim 1, wherein the executed instructions cause the computing system to compute fares for the HCV requests at a different fare rate than fares for the requests for standard vehicles.

7. A non-transitory computer readable medium storing instructions that, when executed by one or more processors of a computing system, cause the computing system to:
receive requests for standard vehicles from computing devices of requesters in a geographic region;
receive requests for high-capacity vehicles (HCVs) from computing devices of HCV requesters in the geographic region;
for both the requests for standard vehicles and the requests for HCVs, match the received requests with standard vehicles to facilitate transport of the requesters and the HCV requesters to destinations indicated in the requests;
based on transport arranged for the HCV requesters in the geographic region over a specified duration of time, generate a set of demand data for HCV transport services in the geographic region; and
execute a route design model using the set of demand data to generate an HCV route network for the geographic region, the HCV route network comprising a set of HCV routes and an HCV schedule for each HCV route in the set of HCV routes.

8. The non-transitory computer readable medium of claim 7, wherein the set of demand data comprise spatial and temporal aspects of the transport requests serviced for the HCV requesters over the specified duration of time.

9. The non-transitory computer readable medium of claim 8, wherein the spatial and temporal aspects correspond to a plurality of: a time for each of the HCV transport requests, start locations of the HCV requesters, and destinations of the HCV requesters.

10. The non-transitory computer readable medium of claim 7, wherein the standard vehicles comprise one or more of sedans, coupes, hatchbacks, station wagons, sport utility vehicles (SUVs), minivans, or luxury vehicles, and wherein the HCVs comprise at least one of vans, trucks, or buses having a seat capacity that exceeds seat capacities of the standard vehicles.

11. The non-transitory computer readable medium of claim 7, wherein the route design model further determines respective seat capacities for HCVs that are to operate on each respective HCV route of the set of HCV routes in accordance with the HCV schedule for the respective HCV route.

12. The non-transitory computer readable medium of claim 7, wherein the executed instructions cause the computing system to compute fares for the HCV requests at a different fare rate than fares for the requests for standard vehicles.

13. A computer-implemented method of managing transport services for a geographic region, the method being performed by one or more processors and comprising:
receiving requests for standard vehicles from computing devices of requesters in a geographic region;
receiving requests for high-capacity vehicles (HCVs) from computing devices of HCV requesters in the geographic region;
for both the requests for standard vehicles and the requests for HCVs, matching the received requests with standard vehicles to facilitate transport of the requesters and HCV requesters to destinations indicated in the requests;
based on transport arranged for the HCV requesters over a specified duration of time, generate a set of demand data for HCV transport services in the geographic region; and
executing a route design model using the set of demand data to generate an HCV route network for the geographic region, the HCV route network comprising a set of HCV routes and an HCV schedule for each HCV route in the set of HCV routes.

14. The method of claim 13, wherein the set of demand data comprise spatial and temporal aspects of the transport requests serviced for the HCV requesters over the specified duration of time.

15. The method of claim 14, wherein the spatial and temporal aspects correspond to a plurality of: a time for each of the HCV transport requests, start locations of the HCV requesters, and destinations of the HCV requesters.

16. The method of claim 13, wherein the standard vehicles comprise one or more of sedans, coupes, hatchbacks, station wagons, sport utility vehicles (SUVs), minivans, or luxury vehicles, and wherein the HCVs comprise at least one of vans, trucks, or buses having a seat capacity that exceeds seat capacities of the standard vehicles.

17. The method of claim 13, wherein the route design model further determines respective seat capacities for HCVs that are to operate on each respective HCV route of the set of HCV routes in accordance with the HCV schedule for the respective HCV route.

18. The method of claim 13, wherein the one or more processors compute fares for the HCV requests at a different rate than fares for the requests for standard vehicles.

* * * * *